3,313,594
METHOD FOR PRODUCING CRYSTALLINE ALUMINOSILICATE ZEOLITIC PARTICLES OF UNIFORM SIZE

Robert C. Wilson, Jr., Woodbury, N.J., assignor to Mobil Oil Corporation, a corporation of New York
No Drawing. Filed July 5, 1963, Ser. No. 293,164
15 Claims. (Cl. 23—113)

The present invention relates to a method for manufacturing inorganic solids of controlled and uniform particle size. More specifically, this invention relates to a method for controlling the effective particle size of crystalline aluminosilicates.

It has recently been discovered that crystalline aluminosilicates are highly useful in a variety of catalytic processes, including many processes employed in the petroleum and petrochemical industry. Such processes include, by way of example, catalytic cracking of hydrocarbons, alkylation, polymerization and isomerization.

The crystalline aluminosilicates have been found to have such high catalytic activity in some reactions that means have been sought to adapt them for use in conventional processing equipment. In this way, present day apparatus, representing very large capital investment, can continue to be used with the new, highly active catalysts until more efficient systems are designed and additional capital becomes available for the replacement of present equipment.

Generally speaking, many of the novel catalysts have relative conversion activities which are several thousand times the activity of the standard cracking catalysts conventionally utilized in the industry. In order to tailor the catalysts to current methods and apparatus, it has been found that the catalysts can be deactivated in a number of ways. For example, deactivation can be accomplished by substituting other cations for the exchangeable natural cations of the catalyst. Steaming and/or diluting the catalyst by incorporating it in a suitable relatively inactive matrix are also satisfactory deactivation techniques.

When deactivation by matrix dilution is employed, it is evident that products having uniform properties can best be achieved if there is a uniform distribution of the highly active catalyst component in the matrix and if the active catalyst material is of uniform particle size. The present invention is directed to the accomplishment of such objective.

As utilized herein and in the appended claims, the term "particle size" refers to effective particle size. The particles of crystalline aluminosilicate produced by conventional methods are actually agglomerates of individual particles, and it is the size of such agglomerates which is here under consideration. Thus, the effective particle size is to be distinguished from the ultimate particle size which refers to the size of the individual particles making up the agglomerates.

The prior art methods for reducing particle size are primarily mechanical processes, such as milling or grinding. Among the disadvantages of mechanical methods is the formation of a large amount of particles which are either too coarse or too fine.

Grinding and milling operations also are obtained by undesirable side effects. Notably, mechanical comminution results in considerable loss of crystallinity in the catalyst particles due to fracture of the crystal lattice under the pressure of milling and similar operations. Since the effectiveness of the aluminosilicates as catalysts is due in large measure to their crystallinity, any decrease in this property is clearly undesirable.

Obtaining catalyst particles of uniform size by methods which also permit control of particle size is further important in the field of fluid catalytic technology. By fluid catalytic processes, reference is had to methods in which a chemical or physical process is brought about or enhanced by contact with finely divided catalyst particles suspended in a fluidizing agent. Taking the process of hydrocarbon conversion as an example, hydrocarbon feed material is cracked to hydrocarbon products of lower average molecular weight by suspending particles of catalytic material in a stream of hydrocarbon vapors under reaction conditions of temperature and pressure.

It is first of all essential that the particle size of fluid catalytic material be such that the particles can be suspended in the fluidizing agent. Since particles of different size will be affected differently by the same stream of fluidizing agent, it is also important that the fluid catalyst particles and the active catalytic component from which the catalyst is prepared be of relatively constant particle size. Otherwise, the particles will either be fluidized too easily and will rapidly separate from the larger particles or, if they are too large, they will collect in a dense phase.

Also, where active catalyst particles are mixed or composited with relatively inactive particles to obtain a catalyst mixture or composite having, on average, the desired catalytic and physical properties, the presence of a large proportion of fines or of coarse particles of the active component is highly undesirable. Such a situation may result in a fluidized bed having non-uniform properties, thereby leading to inefficient and uneven reaction. Thus, it is highly desirable that catalysts for fluid and other processes be formed by a method which permits close control of the particle size of the catalyst and the production of uniform small particles having good crystallinity.

Therefore, an object of the present invention is to provide superactive aluminosilicate catalysts of uniform particle size possessing a high degree of crystallinity.

Another object of the invention is the provision of a method by which finely divided crystalline aluminosilicates of uniform and controllable particle size may be produced without any substantial loss of crystallinity.

A further object of the invention is to provide a method for manufacturing crystalline inorganic solids of controlled and uniform particle size comprising superactive aluminosilicate catalysts, especially suitable for hydrocarbon conversion.

A further object of this invention is a process for manufacturing finely divided crystalline zeolitic material having controlled and uniform particle size for use in hydrocarbon conversion, either alone or in mixture or composited with a relatively inactive diluent.

The above objects and many other highly desirable objects have been achieved according to this invention which comprises formation of a reaction precursor mixture of the desired crystalline aluminosilicate, generally by admixture of a soluble silicate and soluble aluminate along with a dispersing agent in predetermined controlled quantities and digesting the mixture until crystalline particles of controlled and uniform size are obtained.

In accordance with a preferred method, a reactant mixture is prepared by mixing an aluminate and a silicate solution initially at ambient temperature. The composition and ingredients of the reaction mixture are such that a precipitate of the desired aluminosilicate is formed.

The precipitate is then digested first at ambient temperature and then at an elevated temperature until the aluminosilicate is crystallized. The dispersing agent is preferably added to both the silicate and aluminate solutions or to the silicate solutions alone.

In the above-described, two-stage digestion method, the initial ambient temperature digestion is ordinarily conducted for a period of at least 2 hours. Ambient temperature here refers to temperatures ranging from about 50° F. to 100° F. The second, hot digestion is normally conducted until crystallization of the aluminosilicate is achieved, generally for at least about 3 hours, at temperatures in the range of from 185° F. to 250° F.

It has also been found that the particle size characteristics of the molecular sieves can be specifically controlled in the previously described and preferred two-step digestion method by varying the duration of the ambient temperature digestion or of the hot digestion.

The present invention is extremely useful for controlling the effective particle size of crystalline aluminosilicates and preventing the formation of large agglomerates, thus minimizing or eliminating the need for a mechanical comminution.

The features of the invention will be better understood in the light of the following specific examples of preferred embodiments for carrying out the present invention. It will be obvious that different results can be achieved with respect to the exact particle size and particle size distribution by varying the time and temperature of digestion as disclosed herein. It should be noted that this invention lends itself to techniques of either ambient temperature digestion, elevated temperature digestion, the latter designating temperatures greater than ambient temperature or to techniques involving digestion initially at ambient and subsequently at elevated temperatures.

In the following examples, the proportions of aluminate and silicate are controlled to produce an X type molecular sieve. It will be understood, however, that by suitable adjustment of the compositions of the solutions, other synthetic aluminosilicates such as Y and other type molecular sieves may be produced in a similar manner.

EXAMPLE 1

The following solutions were prepared:

*Sodium aluminate solution*

| | Weight percent |
|---|---|
| Sodium aluminate | 8.0 |
| Sodium hydroxide | 5.5 |
| Water | 86.5 |

The specific gravity of the aluminate solution was 1.124 at 60° F.

*Sodium silicate solution*

| | Weight percent |
|---|---|
| Sodium silicate (8.9% wt. $Na_2O$, 28.7% $SiO_2$, 62.4% $H_2O$) | 59.9 |
| Sodium hydroxide | 2.2 |
| Water | 37.9 |

The specific gravity of the silicate solution was 1.233 at 60° F.

The above solutions were reacted in the following manner:

(a) First, 381 grams of the sodium silicate solution were added to 984 grams of filtered sodium aluminate solution at room temperature, with thorough agitation, over a period of about 10 minutes.

(b) The slurry was agitated for 30 minutes and then was digested without agitation at room temperature for approximately 17 hours.

(c) The slurry was heated to 200° F. and digested at that temperature without agitation for about 7 hours and then was cooled quickly to room temeprature.

(d) The resultant crystallized sodium aluminosilicate, i.e. 13X molecular sieve, was washed by reslurrying five times with water (equal in volume to five times the cake volume) and filtering on a Buchner funnel.

(e) The washed product was calcined by heating in a muffle furnace for two hours at 650° F.

Particle size data were obtained on the crystalline aluminosilicate product, formed without the addition of dispersant, by the pipette sedimentation method. According to such method, a 500 ml. sample of the slurry, containing from 1% to 2% wt. of the particulate solid is placed in a graduate and kept at constant temperature. Small portions (10 ml.) of the suspension are pipetted off at different depths on a definite timetable; each sample is evaporated to dryness and the concentration determined. The concentrations are expressed as weight percent finer than "D," the calculated particle diameter corresponding to the time and depth at which the sample was taken. These data are then used to calculate the weight mean particle diameter ($d_w$), and the surface mean particle diameter ($d_s$), and to provide information on particle size distribution.

EXAMPLE 2

The same method for forming crystalline aluminosilicate was followed as set forth in Example 1, except that 0.3% by weight of a dispersant, based on the weight of $SiO_2$ and $Al_2O_3$, was added to the forming solutions. The dispersant was prorated between the silicate solution and the aluminate solution on the basis of the weight of the $SiO_2$ and the $Al_2O_3$ in each.

The dispersant employed was Marasperse CB, a commercially available sodium lignosulfonate dispersant having a pH of from 8.5 to 9.0.

EXAMPLE 3

The aluminosilicate particles were formed as described in Example 2, except that all of the dispersant was added to the aluminate solution.

EXAMPLE 4

The aluminosilicate particles were formed as described in Example 2, except that all of the dispersant was added to the silicate solution.

EXAMPLE 5

The aluminosilicate particles were produced in the same manner as described in Example 2, except that all of the dispersant was added after the aluminosilicate had been precipitated.

EXAMPLE 6

The aluminosilicate particles were prepared in accordance with Example 2, but all of the dispersant was added to the aluminosilicate product after calcining.

The particle size data from each of the foregoing examples, obtained by the pipette sedimentation method, appears in Table I. Such information provides a basis for comparing the effect of adding a dispersant, as opposed to forming without a dispersant and also provides an indication of the optimum method for adding the dispersant.

TABLE I

| Example Number | Method of Introducing Dispersant | Particle Size Data | | | |
|---|---|---|---|---|---|
| | | $d_w, \mu$ | $d_s, \mu$ | Percent | |
| | | | | >10μ | <2μ |
| 1 | None | 6.24 | 3.88 | 5 | 6 |
| 2 | In both solutions | 4.65 | 3.29 | 3 | 10 |
| 3 | In aluminate solution only | 7.27 | 4.02 | 9 | 6 |
| 4 | In silicate solution only | 4.98 | 3.51 | 3 | 7 |
| 5 | After precipitation | 6.33 | 3.72 | 8 | 7 |
| 6 | After calcination | 6.72 | 3.60 | 8 | 7 |

In Table I, $d_w$ is the weight mean particle diameter and $d_s$ is the surface mean particle diameter, both expressed as microns ($\mu$).

The data of Table I clearly indicate that the addition of the dispersant pro rata to both forming solutions or to the silicate solution alone results in the production of a catalyst, the particles of which are smaller and more uniform in size. Where the dispersant is added to both solutions or to the silicate solution alone, only 3% of the particles are above 10μ.

EXAMPLES 7–19

Aluminosilicates were prepared according to Example 2, the dispersant being added to both forming solutions pro rata, based on the $Al_2O_3$ and $SiO_2$ content of each. Various dispersants and amounts of dispersant were employed to determine the effect on particle size. The results are summarized in Table II and the dispersants are identified in the Glossary of Dispersants following the table.

effective concentration for the dispersant. As indicated in the following examples, the results of which appear in Table III, an increase in the concentration of the dispersant tends first to increase the particle size and then,

TABLE II

| Example No. | Dispersant | | Particle Size Data [1] | | | |
|---|---|---|---|---|---|---|
| | Name | Amount, Percent wt.[2] | $d_w, \mu$ | $d_s, \mu$ | Percent | |
| | | | | | $>10\mu$ | $<2\mu$ |
| 7 | None | | 6.24 | 3.88 | 5 | 6 |
| 8 | Marasperse C | 0.2 | 4.76 | 3.24 | 4 | 10 |
| 9 | Marasperse CB | 0.3 | 4.65 | 3.29 | 3 | 10 |
| 10 | ___do___ | 1.0 | 7.20 | 4.38 | 12 | 5 |
| 11 | Marasperse N | 0.4 | 5.46 | 3.35 | 7 | 8 |
| 12 | Atlas G-1690 | 0.01 | 5.44 | 4.18 | 8 | 6 |
| 13 | NaCMC+Na$_2$Cr$_2$O$_7$·2H$_2$O | 0.025+0.15 | 5.02 | 3.69 | 4 | 6 |
| 14 | Carbopol 934 | 0.06 | 6.50 | 3.73 | 12 | 6 |
| 15 | Tetrasodium pyrophosphate | 0.3 | 8.48 | 3.88 | 16 | 7 |
| 16 | Calgon | 0.3 | 4.54 | 3.15 | 4 | 11 |
| 17 | Daxad No. 11 | 1.5 | 4.53 | 3.41 | 2 | 8 |
| 18 | Daxad No. 23 | 1.5 | 6.17 | 3.21 | 5 | 10 |
| 19 | Daxad No. 27 | 1.5 | 3.99 | 3.09 | 0 | 11 |

[1] Determined on calcined product.
[2] Based on Al$_2$O$_3$+SiO$_2$, pro rated between both solutions.

*Glossary of dispersants*

Marasperse C _____ Calcium lignosulfonate; 7–8 pH.
Marasperse CB _____ Sodium lignosulfonate; 8.5–9 pH.
Marasperse N _____ Sodium lignosulfonate; 7–7.5 pH.
Atlas G-1690 _____ Polyoxyethylene alkyl phenol.
NaCMC _____ Sodium carboxymethylcellulose.
Carbopol 934 _____ Synthetic gum.
Tetrasodium pyrophosphate ___ Na$_4$P$_2$O$_7$.
Calgon _____ Complex sodium hexametaphosphate.
Daxad No. 11 _____ Sodium salts of polymerized alkyl naphthalene sulfonic acids; 8–10.5 pH.
Daxad No. 23 _____ Sodium salts of polymerized substituted benzoid alkyl sulfonic acids; 7–8.5 pH.
Daxad No. 27 _____ Daxad No. 23, combined with an inert inorganic suspending agent.

From the above data, it will be seen that the dispersant Daxad No. 27 is very effective in producing catalyst particles of exceptionally well controlled size distribution. The analysis indicated that about 90% of the material falls within the range of from $2\mu$ to $8\mu$ particle diameter.

Marasperse C and Marasperse CB, 0.3% by weight, are also quite effective in obtaining small particles of uniform size distribution.

Many of the other dispersants are shown to be effective to obtain catalyst particles of small and controlled particle size. Among these, Daxad No. 11 and Calgon are quite useful.

It was also learned that there may be more than one effective concentration for controlling the particle size of the product.

upon further increase in the concentration of dispersant, the particle size decreases.

EXAMPLES 20–22

Catalysts were prepared according to Example 2 except that various amounts of Daxad No. 27 were used as the dispersant and that the room temperature digestion period was of about 113 hours instead of about 17 hours as in Examples 1–19.

TABLE III

| Example No. | Amount, percent wt. | Particle Size Data | | | |
|---|---|---|---|---|---|
| | | $d_w, \mu$ | $d_s, \mu$ | Percent | |
| | | | | $>10\mu$ | $<2\mu$ |
| 20 | 0.15 | 2.84 | 1.58 | 2 | 63 |
| 21 | 1.5 | 4.01 | 1.75 | 4 | 53 |
| 22 | 5.0 | 1.77 | 1.35 | 0 | 76 |

Thus, as seen from the results of Examples 20–22, and the data of Table III, dispersants having value in the present invention may exhibit more than one effective concentration for controlling the particle size of the product.

It has also been found that the length of the digestion periods has a significant effect upon the particle size and size distribution of the product. The following examples and the tabulation of the results of the examples in Table IV illustrate this effect.

EXAMPLES 23–24

Aluminosilicates were prepared as described in Example 2, but 1.5% by weight of Daxad No. 11 was added as the dispersant and was pro rated between the forming solutions. Also, room temperature digestion periods were varied as indicated in Table IV.

EXAMPLES 25–27

Aluminosilicates were prepared as in Example 1, using no dispersant, and varying the hot digestion periods as indicated in Table IV.

TABLE IV

| Example No. | Dispersant | Digestion Period, hr. | | Particle Size Data | | | |
|---|---|---|---|---|---|---|---|
| | | At R.T. | At 200° F. | $d_w, \mu$ | $d_s, \mu$ | Percent | |
| | | | | | | $>10\mu$ | $<2\mu$ |
| 23 | 1.5% Daxad No. 11 | 17½ | 7 | 4.53 | 3.41 | 2 | 8 |
| 24 | ___do___ | 113 | 7 | 2.73 | 1.63 | 2 | 48 |
| 25 | None | 17½ | 6 | 5.45 | 3.14 | 10 | 14 |
| 26 | ___do___ | 17½ | 9 | 5.56 | 3.09 | 8 | 14 |
| 27 | ___do___ | 17½ | 15 | 5.77 | 3.08 | 8 | 14 |

From the data of Table IV, it is apparent that increasing the room temperature digestion period from 17.5 hours to about 113 hours decreases the $d_w$ by 1.80$\mu$ or at the rate of about 0.019$\mu$/hr. On the other hand, increasing the hot digestion period from 6 hours to 15 hours increases the $d_w$ by 0.32$\mu$ or at the rate of about 0.036$\mu$/hr.

Since a wide variety of dispersants are suitable for use in this invention, the optimum concentration for each can readily be evaluated following the foregoing principles. The preferred method for introducing the dispersant may vary for different types of dispersants. However, regardless of the dispersant, certain minimum requirements must be met: i.e., (1) it must be soluble in the reactant solutions, (2) it must not react with the silicate or aluminate, and (3) it must be stable in a highly alkaline medium.

The present invention provides for the production of crystalline aluminosilicates of fine particle size by a method which permits close control over the size and size distribution of the product. Due to their closely controlled size, the aluminosilicate products are highly useful in catalytic systems of the fluid type and in the manufacture of catalyst compositions comprising mixtures or composites of highly active crystalline aluminosilicate particles with less active materials.

It will be obvious to one skilled in the art that the present invention described in relation to certain specific embodiments can be varied with respect to the materials, conditions and procedures without departing from the scope of the invention as expressed in the following claims.

What is claimed is:

1. A method for producing crystalline aluminosilicate zeolitic particles of uniform size comprising introducing into the aqueous reaction precursor mixture comprising a soluble silicate and a soluble aluminate of said aluminosilicate, a dispersant stable and soluble therein in an amount sufficient to control the particle size and digesting the resulting mixture until crystallization of said aluminosilicate is achieved.

2. A method for producing crystalline aluminosilicate zeolitic particles of uniform size comprising introducing into the aqueous reaction precursor mixture comprising a soluble silicate and a soluble aluminate of said aluminosilicate, a dispersant stable and soluble therein in an amount sufficient to control the particle size and digesting the resulting mixture initially at a temperature in the approximate range of 50° F. to 100° F. for at least about two hours and thereafter at a temperature in the approximate range of 185° F. to 250° F. until crystallization of said aluminosilicate is achieved.

3. A method for producing crystalline aluminosilicate zeolitic particles of uniform size comprising introducing into the aqueous reaction precursor mixture of said aluminosilicate resulting from admixture of a water soluble silicate and a water soluble aluminate, and before precipitate formation attributable to reaction between said silicate and said aluminate, a dispersant stable and soluble in said mixture in an amount sufficient to control the particle size and digesting the resulting mixture until crystallization of said aluminosilicate is achieved.

4. A method for producing crystalline aluminosilicate zeolitic particles as defined in claim 3 wherein at least a portion of said dispersant is introduced into said mixture by prior addition to said silicate.

5. A method for producing crystalline aluminosilicate zeolitic particles of uniform size comprising,
preparing an aqueous aluminate solution and an aqueous silicate solution, said aluminate and silicate solutions being capable of reacting when in mixture to form a precipitate of an aluminosilicate,
mixing said aluminate and said silicate solutions in the presence of a water soluble dispersant, in an amount sufficient to control the particle size,
digesting said precipitate at ambient temperature for at least two hours, and
digesting said precipitate at a temperature in the range of from 185° F. to 250° F. for at least three hours to crystallize said aluminosilicate in the form of particles of uniform size.

6. A method for producing crystalline aluminosilicate zeolitic particles as defined in claim 5 wherein said water soluble dispersant is introduced into said mixture in an amount sufficient to control the particle size by addition to said silicate solution.

7. A method for producing crystalline aluminosilicate zeolitic particles as defined in claim 5 wherein said water soluble dispersant is introduced into said mixture in an amount sufficient to control the particle size by addition to both said aluminate and said silicate solutions.

8. A method for producing crystalline aluminosilicate zeolitic particles as defined in claim 5 wherein said water soluble dispersant is introduced into said mixture in an amount sufficient to control the particle size by addition to both said aluminate and said silicate solutions, the amount of said dispersant added to each of said solutions being pro-rated on the basis of the weight of alumina and silica in each of said solutions.

9. The method of claim 5 wherein said dispersant in an amount sufficient to control the particle size is a compound selected from the group consisting of calcium lignosulfonate, sodium lignosulfonate, sodium carboxymethylcellulose, sodium hexametaphosphate, and sodium salts of polymerized alkyl aryl sulfonic acids.

10. The method of claim 1 wherein the amounts of said aluminate and said silicate solutions are proportioned to produce a synthetic faujasite selected from zeolite X and zeolite Y.

11. A method for producing crystalline aluminosilicate zeolitic particles of uniform size comprising,
preparing an aqueous aluminate solution and an aqueous silicate solution, said aluminate and silicate solutions being capable of reacting when in mixture to form a precipitate of an aluminosilicate,
mixing said aluminate and said silicate solutions in the presence of up to 5% by weight of a water soluble dispersant in an amount sufficient to control the particle size,
digesting said precipitate at ambient temperature for at least two hours, and
digesting said precipitate at a temperature in the range of from 185° F. to 250° F. for at least three hours to crystallize said aluminosilicate in the form of particles of uniform size.

12. A method for producing crystalline aluminosilicate zeolitic particles as defined in claim 11 wherein said water soluble dispersant is introduced into said mixture in an amount sufficient to control the particle size by addition to said silicate solution.

13. A method for producing crystalline aluminosilicate zeolitic particles as defined in claim 11 wherein said water soluble dispersant is introduced into said mixture in an amount sufficient to control the particle size by addition to both said aluminate and said silicate solutions.

14. A method for producing crystalline aluminosilicate zeolitic particles as defined in claim 11 wherein said water soluble dispersant is introduced into said mixture in an amount sufficient to control the particle size by addition to both said aluminate and said silicate solutions, the amount of said dispersant added to each of said solutions being pro-rated on the basis of the weight of alumina and silica in each of said solutions.

15. The method of claim 11 wherein said dispersant in an amount sufficient to control the particle size is a compound selected from the group consisting of calcium lignosulfonate, sodium lignosulfonate, sodium carboxymethylcellulose, sodium hexametaphosphate, and sodium salts of polymerized alkyl aryl sulfonic acids.

References Cited by the Examiner

UNITED STATES PATENTS 2,882,244  4/1959  Milton _____ 23—112 X
3,130,007  4/1964  Breck _____ 23—113
3,185,544  5/1965  Maher _____ 23—112

OSCAR R. VERTIZ, *Primary Examiner.*

E. J. MEROS, *Assistant Examiner.*